(12) United States Patent
Lee et al.

(10) Patent No.: US 7,009,344 B2
(45) Date of Patent: *Mar. 7, 2006

(54) FLAT PANEL DISPLAY DEVICE HAVING PLANAR FIELD EMISSION SOURCE

(75) Inventors: Chun-Gyoo Lee, Gwacheon (KR); Sung-Ho Jo, Seongnam (KR); Jong-Hun You, Suwon (KR); Jong-Min Kim, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/657,135

(22) Filed: Sep. 9, 2003

(65) Prior Publication Data

US 2004/0046493 A1 Mar. 11, 2004

Related U.S. Application Data

(63) Continuation of application No. 09/967,936, filed on Oct. 2, 2001, now Pat. No. 6,617,798, and a continuation-in-part of application No. 09/533,202, filed on Mar. 23, 2000, now Pat. No. 6,380,671.

(30) Foreign Application Priority Data

Feb. 12, 2001 (KR) .................................. 2001-6829

(51) Int. Cl.
*G09G 3/10* (2006.01)

(52) U.S. Cl. ............................. 315/169.3; 315/169.1; 313/495; 345/75.2

(58) Field of Classification Search ............. 315/169.1, 315/169.3, 169.2, 169.4; 345/75.1, 75.2; 313/495, 496, 497, 306, 310, 311
See application file for complete search history.

(56) References Cited

U.S. PATENT DOCUMENTS

| | | | |
|---|---|---|---|
| 5,548,185 A | 8/1996 | Kumar et al. | 313/495 |
| 5,637,950 A | 6/1997 | Jin et al. | 313/310 |
| 5,726,524 A | 3/1998 | Debe | 313/310 |
| 6,225,761 B1 | 5/2001 | Dworsky et al. | 315/366 |
| 6,236,156 B1 | 5/2001 | Ito | 315/169.3 |
| 6,274,881 B1 | 8/2001 | Akiyama et al. | 313/310 |
| 6,346,023 B1 | 2/2002 | Tsuboi et al. | 313/310 |

FOREIGN PATENT DOCUMENTS

JP 10-288794 A 10/1998

*Primary Examiner*—Tuyet Vo
*Assistant Examiner*—Ephrem Alemu
(74) *Attorney, Agent, or Firm*—H.C. Park & Associates, PLC (57) ABSTRACT

A flat panel display includes a back plate, gate electrode and cathode electrodes disposed on the back plate and insulated from each other by an insulating layer, a planar field emission source formed of carbonaceous material disposed on the cathode electrode, a grid plate provided with a plurality of apertures corresponding to a pixel area and spaced from the back plate, first and second grid electrodes formed on each surface of the grid plate, respectively, and a faceplate spaced from the grid plate and a screen formed on one surface thereof facing the grid plate.

6 Claims, 6 Drawing Sheets

FLAT PANEL DISPLAY DEVICE HAVING PLANAR FIELD EMISSION SOURCE

CROSS REFERENCE TO RELATED APPLICATION

This is a continuation application of the U.S. patent application Ser. No. 09/967,936 filed on Oct. 2, 2001, which has now become U.S. Pat. No. 6,617,798.

This application is a continuation-in-part application of U.S. patent application Ser. No. 09/533,202 filed on Mar. 3, 2000 now U.S. Pat. No. 6,380,671, which is incorporated by reference herein in its entirety.

BACKGROUND OF THE INVENTION

1. Field of the Invention

The present invention relates to a flat panel display (FPD), and more particularly, to a flat panel display having a planar field emission source formed of a low work function material.

2. Description of the Related Art

Figure 1:
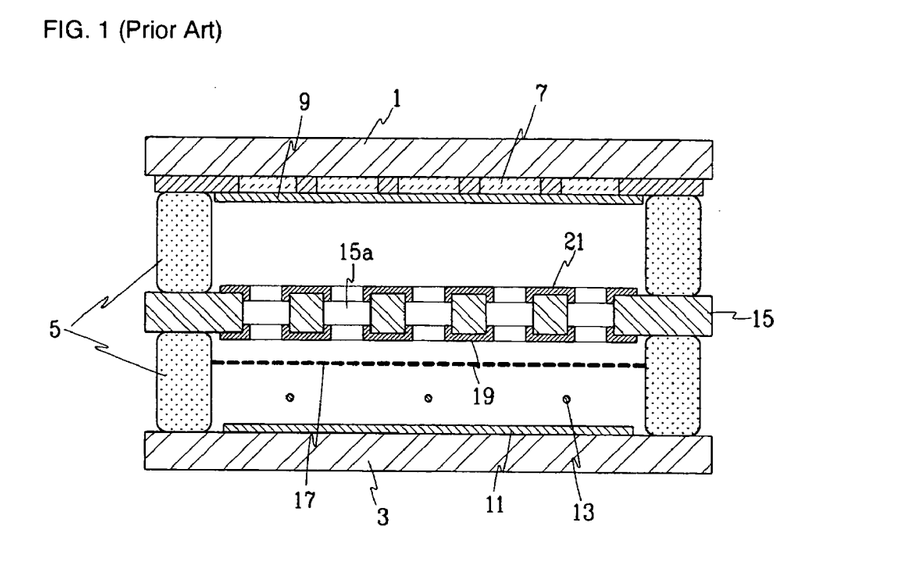
FIG. 1 is a sectional view of a conventional flat cathode ray tube.

FIG. 1 shows a conventional flat cathode ray tube. As shown in the drawing, a faceplate 1 and a back plate 3 are sealed by a sealant 5. A phosphor layer 7 and a metal film 9 are formed on an inner surface of the faceplate 1. A rear electrode 11 is formed on an inner surface of the back plate 3, which faces the inner surface of the faceplate 1. In addition, a plurality of tungsten line cathodes 13 is used as an electron emission source. A grid plate 15 and a mesh electrode 17 are disposed between the faceplate 1 and the back plate 3.

The grid plate 15 has a plurality of apertures 15a that are formed corresponding to pixels for passing electrons. First and second grid electrodes 19 and 21 are respectively formed on each surface of the grid plate 15. Each of the first and second grid electrodes 19 and 21, for example, function as scan and data electrodes.

Electrons emitted from the tungsten line cathodes 13 pass through the aperture 15a of the grid plate 15 under the control of the first and second grid electrodes 19 and 21, and land on light emitting anode to excite the phosphor layer 7 by a strong electric field applied to the metal film 9.

However, said flat cathode ray tube cannot easily be adapted for a large-sized display since the line cathodes 13 are used as the electron emission source. For a large-sized display, the line cathodes 13 need to extend the length, keeping the space between each other. Accordingly, uniformity of electron-emission and the luminescence of the phosphor layers 7 will be deteriorate because the line cathodes 13 tend to vibrate and the emission source becomes sparely distributed. Furthermore, the heat generated in the line cathodes 13 deforms the grid plate 15, resulting in misalignment of the apertures 15a and the corresponding phosphor layers 7.

To solve the above-described problems, U.S. Pat. No. 4,719,388 discloses a flat electron control device having a grid-shaped accelerator electrode disposed between wire-like cathodes and an address plate having apertures.

Although the flat electron control device has an advantage of emitting electrons under more stable conditions, it is still difficult to realize a large-sized display as it comprises a wire-like cathode.

SUMMARY OF THE INVENTION

It is an objective of the present invention to provide a flat panel display that has an advantage in realizing a large-sized display by changing the structure of the electron emission source.

It is another objective of the present invention to provide a flat panel display that can operate under a low driving voltage with improved performance of emission, convergence and acceleration, by using a low work function material as the field emission source.

To achieve the above objects, the present invention provides a flat panel display including a back plate, cathode and gate electrodes disposed on the back plate and insulated from each other by an insulating layer, a planar field emission source formed on the cathode electrode, a grid plate provided with a plurality of apertures corresponding to a pixel area and spaced from the back plate, and a faceplate spaced from the grid plate and having a screen formed on one surface thereof facing the grid plate.

The field emission source is formed of a material or mixture of carbonaceous materials selected from the group consisting of carbon nanotube (CNT), fullerene ($C_{60}$), diamond liked carbon (DLC), and graphite.

The flat panel display further includes a first grid electrode on a back surface of the grid plate facing the back plate, and a second grid electrode on a front surface of the grid plate facing the faceplate.

Preferably, the first and second grid electrodes have a structure of plural line patterns along the aperture array that is perpendicular to the cathode electrode pattern. Each line pattern of the second grid electrode comprises two sub-electrodes that are bisected by the line of the aperture array on the grid electrode.

Alternatively, the grid plate is formed of a mesh electrode.

The flat panel display further comprises a plurality of first spacers formed on a non-effective area of the back plate for maintaining the space between the back plate and the grid plate, and a plurality of second spacers formed on a non-effective area of the grid plate for maintaining the space between the grid plate and the faceplate, wherein an aspect ratio of the second spacers is higher than the first spacers.

The gate electrode is formed on the surface of the back plate, the insulating layer is disposed on the surface of the back plate covering the gate electrode, and the cathode electrode is formed on the insulating layer. Preferably, the gate electrode and the cathode electrode have a structure of plural line patterns and intersect each other at right angles. The planar field emission source is formed on an edge of the cathode electrode.

Alternatively, the cathode electrode is formed on the surface of the back plate and having the planar field emission source corresponding to the pixel area. The insulating layer is disposed on the surface of the back plate to cover the cathode electrode except the planar field emission source. The gate electrode is formed on the insulating layer except the planar field emission source. Preferably, the gate electrode and the cathode electrode have a structure of plural line patterns and intersect each other at right angles.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will be described in detail with reference to the accompanying drawings.

Figure 2:
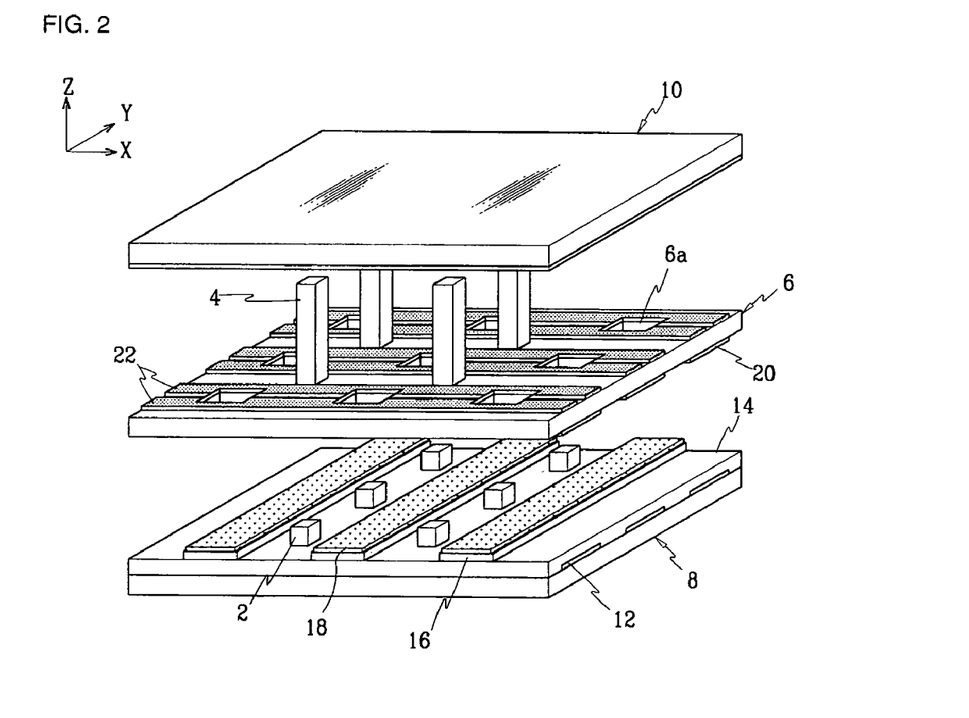
FIG. 2 is an exploded perspective view of a flat panel display according to a first embodiment of the present invention.
Figure 3:
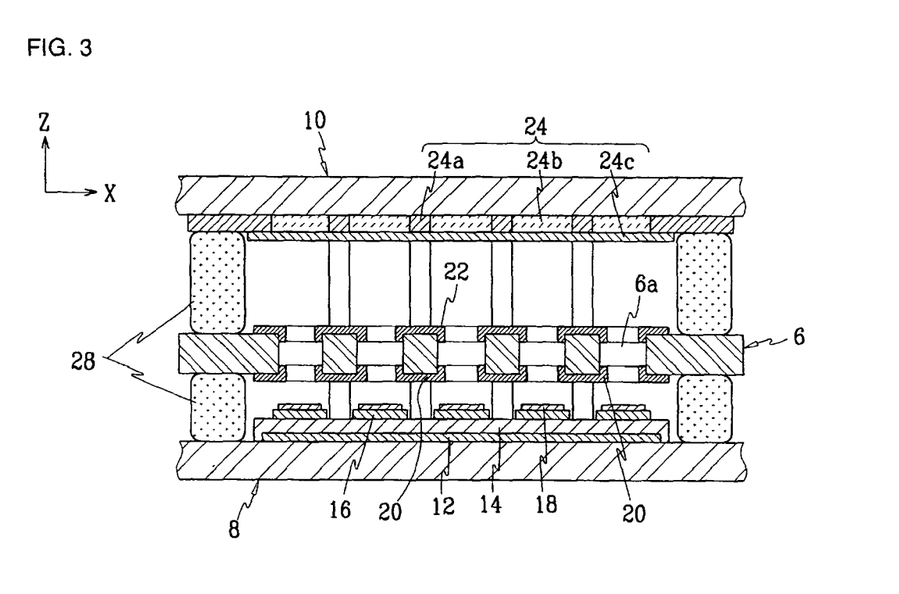
FIG. 3 is a sectional view taken along an X-axis of FIG. 2.

FIGS. 2 and 3 show a flat panel display according to a first preferred embodiment of the present invention.

As shown in the drawings, the inventive flat panel display comprises a back plate 8, a grid plate 6 and a faceplate 10 that are spaced from each other by first and second spacers 2 and 4 and sealed by sealant 28. The display maintains its internal vacuum sufficiently high enough to permit electrons to move freely.

A gate electrode 12 is formed on a surface of the back plate 8, facing the grid plate 6. The gate electrode 12 is structured to have a plurality of line patterns arranged in a direction of an X-axis. An insulating layer 14 is disposed on the surface of the back plate 8 to cover the gate electrode 12. A cathode electrode 16 is formed on the insulating layer 14, the cathode electrode 16 having a structure of plural line patterns arranged in a direction of a Y-axis.

For example, the gate electrode 12 is formed by screen-printing Ag paste, preferably having a width of about 120 $\mu$m and a pitch of about 280 $\mu$m. The insulating layer 14 is formed through plural screen-printing process of glass paste including silicon oxide. Preferably, a thickness of the insulating layer 14 is about 15–40 $\mu$m. The cathode electrode 16 is formed by screen-printing Ag paste on the insulating layer 14, preferably having a width of about 150 $\mu$m and a pitch of about 830 $\mu$m.

As a planar field emission source, an emitter 18 of low work function material is provided on the cathode electrode 16. The emitter 18 is formed of carbonaceous material, preferably formed of a material or mixture of carbonaceous materials selected from the group consisting of carbon nanotube (CNT), fullerene ($C_{60}$), diamond liked carbon (DLC), and graphite.

Figure 4:
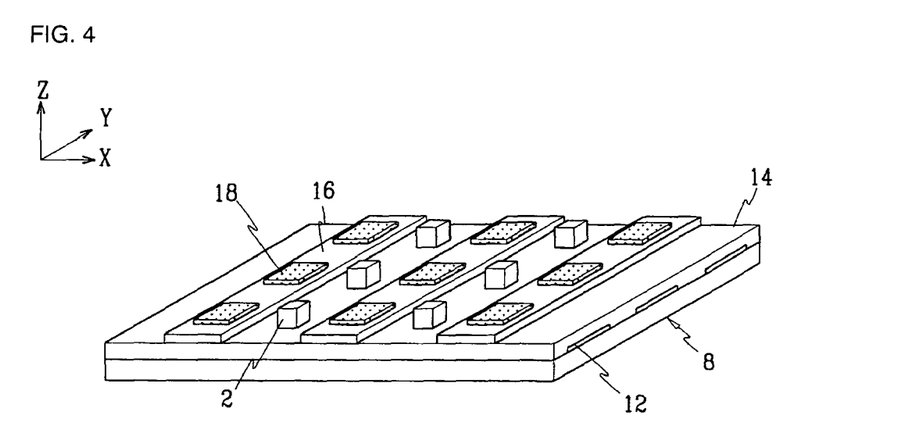
FIG. 4 is a perspective view of a back plate for illustrating another example of a planar field emission source according to the present invention.

FIG. 2 shows the emitter 18 that is spread on the cathode electrode 16. Alternatively, as shown in FIG. 4, the emitter 18 can be patterned to be placed on this intersection of the line patterns of the cathode electrodes 16 and the gate electrodes 12.

Figure 5:
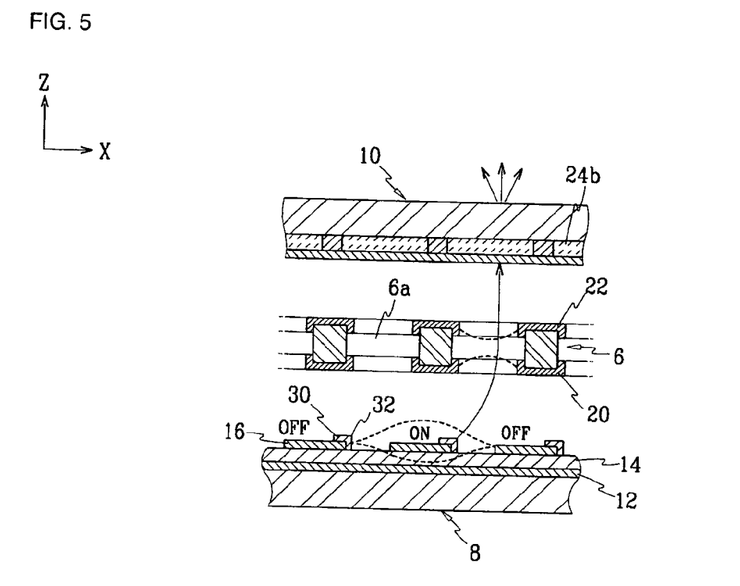
FIG. 5 is a sectional view of the flat panel display of FIG. 2 for illustrating path of electrons emitted from the planer field emission source.

Otherwise, as shown in FIG. 5, an emitter 30 may be formed along one edge of the cathode electrode 16, thereby forming an edge 32. Forming an edge in the emitter is preferably, because an electric field is more concentrated on the edge 32 of the emitter 30. Therefore, even lower voltage may enable the emitter 30 to emit electrons, thereby making it possible to drive the display at lower voltage level.

In addition, the emitters may be easily patterned using a well-known thin film or thick film process. For example, a screen-printing process, a chemical vapor deposition (CVD) process, or a sputtering process may be used. The emitters that can be easily formed by such diverse film processes, and can stably emit electrons at a low voltage level can achieve a large-size display very effectively.

The grid plate 6 is disposed above the back plate 8 and supported by the first spacers 2 placed on the non-effective area of the back plate 8. The grid plate 6 has a plurality of apertures 6a corresponding to a pixel area to allow electrons to pass.

As an example, the grid plate 6 may be formed of a photosensitive glass substrate, and the apertures 6a each having a high aspect ratio can be formed through a well-known photolithography process. In another example, the grid plate 6 may be formed of a glass substrate, and the apertures 6a can be formed through a well-known sand blast or a laser punching process.

It is preferable that, the grid plate 6 is formed having a thickness of about 700 $\mu$m. Each of the apertures 6a is formed in a square-shape having a size of about 600×200 $\mu$m as shown in FIG. 2. A distance between the adjacent apertures 6a in a direction of the X-axis is about 830 $\mu$m and a distance between the adjacent apertures 6a in a direction of the Y-axis is about 280 $\mu$m.

A first grid electrode 20 and the second grid electrode 22 are formed on each surface of the grid plate 6. The first grid electrode 20 faces the back plate 8 and the second grid electrode 22 faces the faceplate 10. Both the first grid electrode 20 and the second grid electrode 22 have a structure of plural line patterns along an aperture array that is perpendicular to the cathode electrode 16. In other words, each line pattern of the first grid electrode 20 and the second grid electrode 22 are arranged in a direction of the X-axis.

It is preferable that, each line pattern of the second grid electrode 22 includes two sub-electrodes. The sub-electrodes are divided by the line of the center aperture array to deflect the electrons passing through the apertures 6a using a voltage difference therebetween.

The first grid electrode 20 and the second grid electrode 22 may extend to the inner walls of the apertures 6a so as to prevent electrons from being accumulated on the inner walls of the apertures 6a. In addition, the shortened distance between electron paths through the apertures 6a and each of the first and second grid electrodes 20 and 22 enables those electrodes to easily control the electrons.

The faceplate 10 is disposed above the grid plate 6 and supported by the second spacers 4 formed on a non-effective area of the grid plate 6.

A screen 24 is defined on a surface of the faceplate 10 that faces the grid plate 6. As shown in FIG. 3, the screen 24 includes a phosphor layer 24b formed of red R, green G, and blue B phosphors. The phosphor layer 24b is divided by a black matrix 24a and is formed on the screen 24. The screen 24 also includes a metal film 24c formed on the phosphor layer 24b.

A first driving method of the flat panel display according to the first embodiment of the present invention is now described with reference to FIG. 5.

Scan and data signal voltages are applied to the cathode electrode 16 and the gate electrode 12, respectively, to form an electric field around the emitter 18. The electric field emits electrons from the emitter 18. A focus signal voltage is applied to the first grid electrode 20 to convergence the electrons to the apertures 6a of the grid plate 6. A deflection signal voltage is applied to the second grid electrode 22 so as to deflect the electrons passing through the apertures 6a to corresponding target phosphors. An anode signal voltage is applied to the metal film 24c to accelerate the electrons to the screen 24.

More in detail, to turn on a specific pixel, when a data signal voltage of +70V and a scan signal voltage of −70V are respectively applied to the gate electrode 12 and the cathode electrode 16, electrons are emitted from the emitter 30 corresponding to the pixel. Otherwise, when one of the intersecting cathode electrode 16 and the gate electrode 12 is applied with 0V, a specific pixel located corresponding to the intersecting cathode electrode 16 and the gate electrode 12 is turned to an Off-state. By this procedure, all of pixels are On/Off-controlled.

The first grid electrode 20 is applied with a focus signal voltage to focus the electron flow in the aperture 6a to prevent the electrons from being dispersed. For example, when a gap between the first grid electrode 20 and the emitter 30 is 200 μm, the first grid electrode 20 may be applied with a focus voltage of about +70V.

Figure 6:
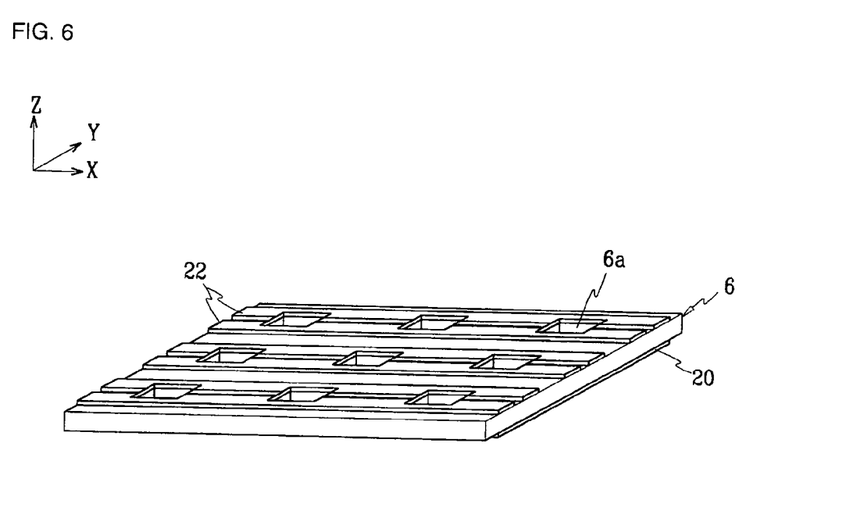
FIG. 6 is a perspective view of a grid plate for illustrating another example of a first grid electrode pattern according to the present invention.

In the above driving method, the first grid electrode 20 may be formed of a single layer as shown in FIG. 6, and the focus signal voltage is applied to the single layer.

At this point, when the emitter 30 is formed at one edge of the cathode electrode 16 as shown in FIG. 5, it is preferable that the center of each aperture 6a is shifted from the center of the cathode electrode 16, since the electrons radiate from the edge 32 of the emitter 30. For example, the grid plate 6 is disposed such that an edge of each aperture 6a is aligned with the edge 32 of corresponding emitter 30.

Figure 7:
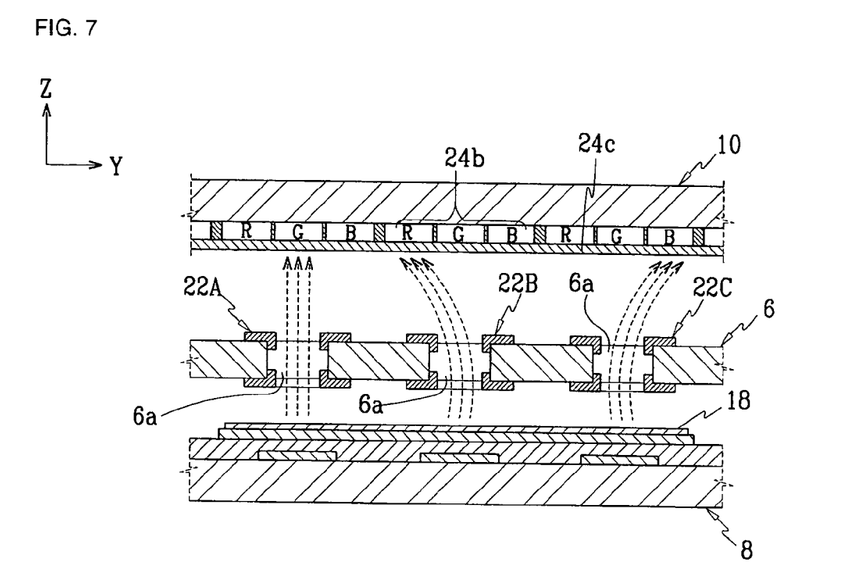
FIG. 7 is a sectional view taken along the Y-axis of a flat panel display for illustrating an electron deflection at a second grid electrode pattern according to the present invention.

A set of the R, G and B phosphors is formed corresponding to a single aperture to realize a high resolution. FIG. 7 shows a deflection of the electrons by the second grid electrode 22. Each line pattern of the second grid electrode 22 includes two sub-electrodes that are disposed on the left and right sides of the apertures 6a.

In FIG. 7, when a straight deflection signal voltage, for example, a voltage of about +300V is applied to the sub-electrodes (left and right electrodes) of the line electrode 22A (i.e., when voltage levels applied to the sub-electrodes are the same as each other), the electrons pass through the apertures 6a straight and then land on the green G phosphor.

When a leftward deflection signal voltage (for example, +350V to the left electrode and +250V to the right electrode) is applied to the sub-electrodes of the line electrode 22B (i.e., when a voltage level applied to the left sub-electrode is higher than that applied to the right sub-electrode), the electrons are deflected leftward and land on the red R phosphor.

When a rightward deflection signal voltage (for example, +350V to the right electrode and +250V to the left electrode) is applied to the sub-electrodes of the line electrode 22C (i.e., when a voltage level applied to the right sub-electrode is higher than that applied to the left sub-electrode), the electrons are deflected rightward when passing through the aperture 6a and land on the blue B phosphor.

Generally, to realize a high-resolution display, the distance between the apertures 6a should be precisely designed. However, it is very difficult to precisely set the distance between the apertures 6a due to the error margins in manufacturing of the grid plate 6. Accordingly, the electrons passing through the apertures 6a should be deflected to the predetermined directions. Therefore, by passing electrons through one aperture 6a toward the corresponding target phosphors, the high definition display can be easily realized.

Finally, the anode signal voltage is applied to the metal film 24c of the faceplate 10 for overall display. The anode signal voltage higher than those corresponding to other signal voltages is set at about 5 kV so as to accelerate electrons toward the screen 24.

At this point, to obtain the higher luminescence, the voltage difference between the second grid electrode 22 and the metal film 24c should be increased. This means that the distance between the grid plate 6 and the faceplate 10 should be increased.

Accordingly, it is preferable that spacers 4 of a higher aspect ratio are placed between the grid plate 6 and the faceplate 10. Preferably, a height of the spacers 4 is about 30–300 μm. However, since it is difficult to form the second spacers 4 through the screen printing process, the spacers having a high aspect ratio are first manufactured using a glass or ceramic material, and then attached on one of the plates or inserted in grooves (not shown) formed on the gird plate 6.

A second method for driving the flat panel display according to the first embodiment of the present invention is now described.

Scan and data signal voltages are applied to the cathode electrode 16 and the first grid electrode 20, respectively, to form an electric field. Thus, the emitter 18 emits electrons by the electric field. A field enhancing signal voltage is applied to the gate electrode 12, and a deflection signal voltage is applied to the second grid electrode 22 so that electrons passing through the apertures 6a of the grid plate 6 can be deflected to the corresponding target phosphors. An anode signal voltage is applied to the metal film 24c to accelerate the electrons to the screen 24.

In this driving method, the cathode electrode 16 and the first grid electrode 20 are respectively used as a scan electrode and a data electrode, and the gate electrode 12 is used as an field enhancing electrode. More in detail, to turn On a specific pixel, when a data signal voltage of +70V and a scan signal voltage of −70V are respectively applied to the first grid electrode 20 and the cathode electrodes 16, electrons are emitted from the emitter 18 corresponding to the pixel. In addition, when one of the intersecting the first grid electrode 20 and the cathode electrode 16 is applied with 0V, a specific pixel located corresponding to the intersecting the first grid electrode 20 and the cathode electrode 16 is turned to an Off-state.

When the back plate 8 and the grid plate 6 are closely disposed, the electron emission can be easily produced even by a lower voltage applied to the cathode electrode 16 and the first grid electrode 20.

According to a plurality of tests, it has been proved that it is preferable that the distance between the back plate 8 and the grid plate 6 is about 30~200 μm. Consequently, even when the first spacers 2 are formed using a conventional screen-printing process, the distance required between the back plate 8 and the grid plate 6 can be attained.

Figure 8:
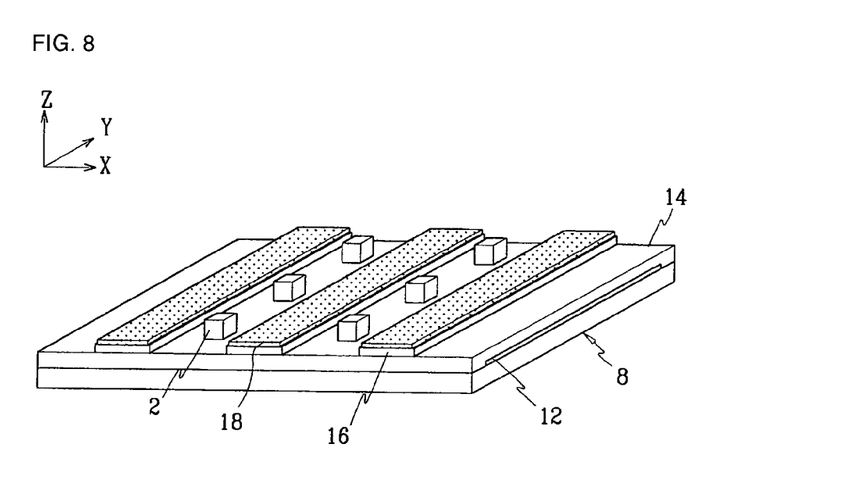
FIG. 8 is a perspective view of a back plate for illustrating another example of a gate electrode pattern according to the present invention.

Alternatively, the gate electrode 12 can be formed of a single layer as shown in FIG. 8. The field enhancing signal voltage is applied to the single layer. Preferably, the field enhancing signal voltage is set at about 0V.

Figure 9:
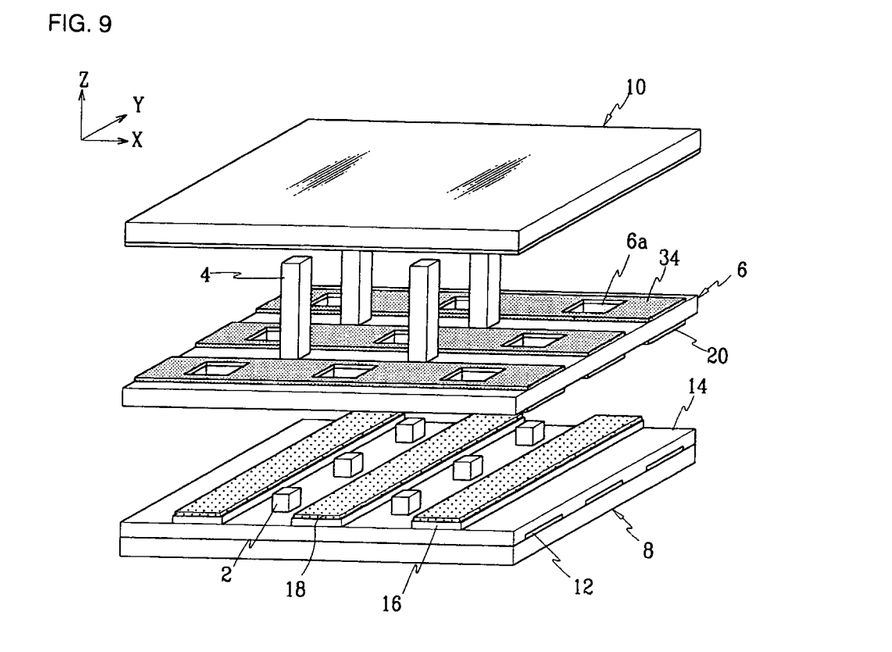
FIG. 9 is an exploded perspective view of a flat panel display according to a second embodiment of the present invention.

FIG. 9 shows a flat panel display according to a second preferred embodiment of the present invention.

In this embodiment, each line pattern of a second grid electrode 34 is not divided by the line of an aperture array, but formed in a line pattern along the aperture array like the first grid electrode 20. The phosphor layer (not shown) is formed such that each red R, green G, and blue B phosphor layer is disposed corresponding to a single aperture 6a. This structure may be used for a relatively low definition display in which electrons do not have to be deflected.

A third driving method on the basis of the above described second embodiment flat panel display is now described.

Scan and data signal voltages are applied to the cathode electrode 16 and the first electrode 20, respectively. Thus, electrons are emitted from the emitter 18 by an electric field generated around the emitter 18. Then, a field enhancing signal voltage is applied to the gate electrode 12, and a focus signal voltage is applied to the second grid electrode 34 so as to converge electrons at the apertures 6a of the grid plate 6. An anode signal voltage is applied to the metal film to accelerate the electrons toward the screen 24.

For example, the driving voltages applied to the first grid electrode 20 and the cathode electrode 16 and the field enhancing voltage applied to the gate electrode 12 are identical to those in the above described embodiments. However, a focus signal voltage of about +300V may be applied to the second grid electrode 34.

By the focusing operation of the second grid electrode 34, the electrons are converged toward the corresponding phosphors while passing through the apertures 6a of the grid plate 6, and can precisely land on the corresponding target phosphors.

Figure 10:
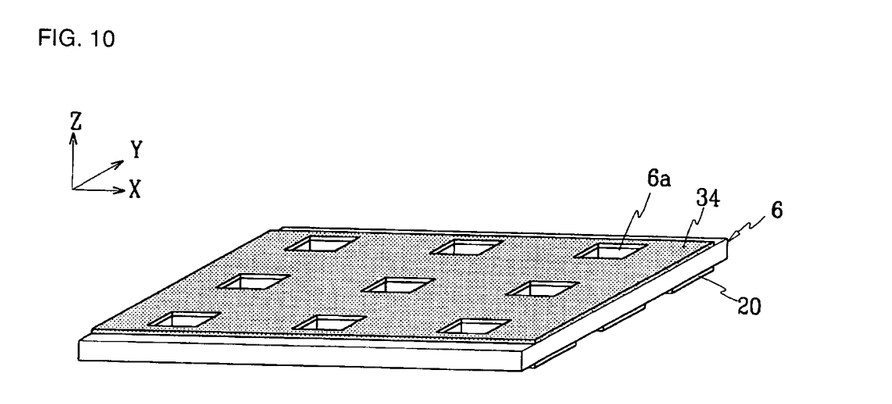
FIG. 10 is a perspective view of a grid plate for illustrating another example of a second grid electrode pattern according to the present invention.

In this driving method, the second grid electrode 34 can be formed of a single layer as shown in FIG. 10 and the focus signal voltage is applied to the single layer.

Figure 11:
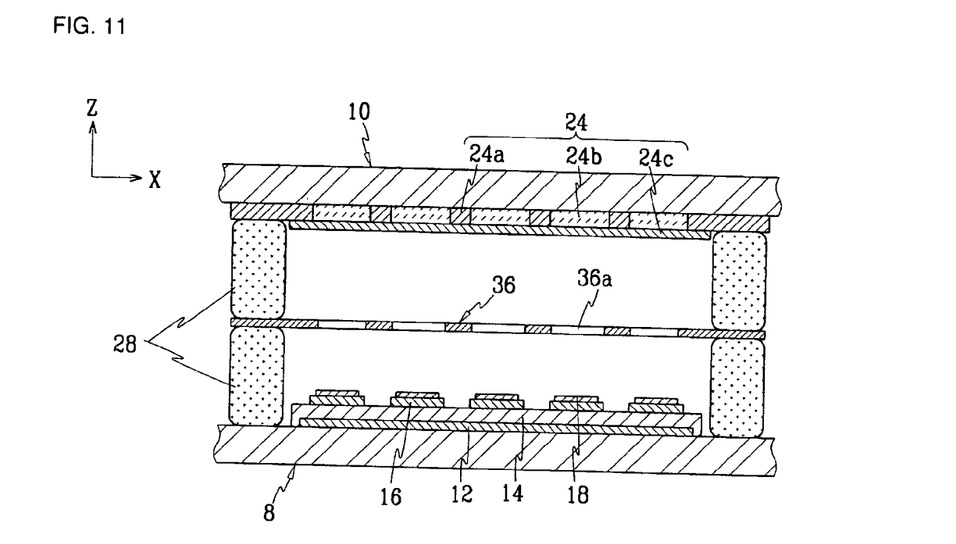
FIG. 11 is a sectional view of a flat panel display according to a third embodiment of the present invention.

FIG. 11 shows a flat panel display according to a third embodiment of the present invention. The inventive flat panel display provides a mesh electrode 36 as a substitute for the grid plate in the first and second embodiment of the present invention. The mesh electrode 36 has a plurality of apertures 36a corresponding to a pixel area and disposed between a back plate 8 and a faceplate 10 with predetermined distance from these plates.

Preferably, the mesh electrode 36 does not have any grid electrode on its surface, and a certain signal voltage is applied to the mesh electrode itself. The mesh electrode 36 can be formed of a conventional metal mesh plate.

A fourth driving method using the above described third embodiment flat panel display is now described.

Scan and data signal voltages are applied to a cathode electrode 16 and a gate electrode 12, respectively. Thus, electrons are emitted from the emitter 18. A focus signal voltage is applied to the mesh electrode 36 so as to converge electrons at the apertures 36a of the mesh electrode 36. An anode signal voltage is applied to the metal film 24c to accelerate the electrons toward a screen 24. At this point, a focus signal voltage of +100 may be applied to the mesh electrode 36.

By the focusing operation of the mesh electrode 36, the electrons can be converged and precisely land on the corresponding target phosphors.

Figure 12:
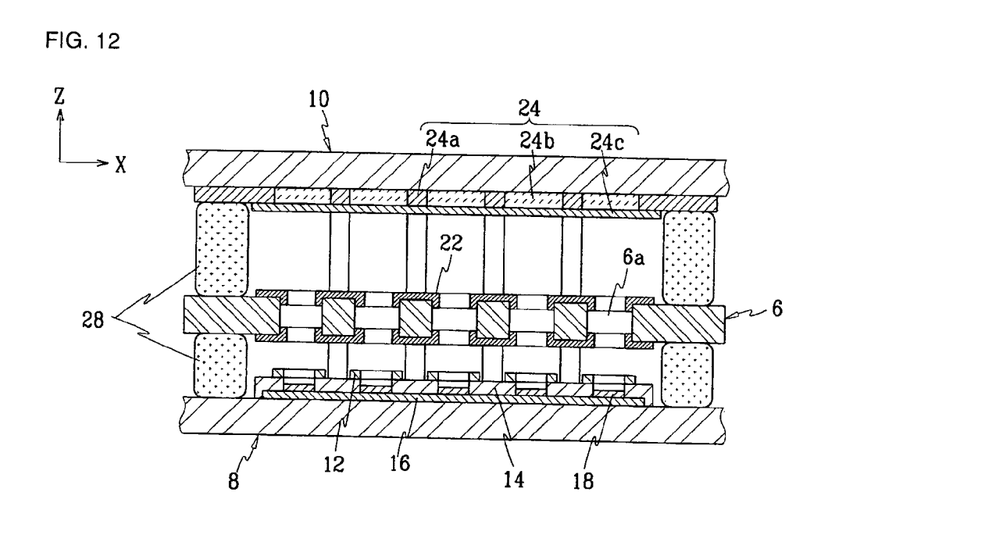
FIG. 12 is a sectional view of a flat panel display according to a fourth embodiment of the present invention.

FIG. 12 shows a flat panel display according to a fourth preferred embodiment of the present invention.

In this embodiment, a cathode electrode 16 is formed on a surface of the back plate 8 facing the grid plate 6, the cathode electrode 16 having a plurality of line patterns arranged in a direction of the X-axis. An emitter 18 is provided on the cathode electrode 16 corresponding to the pixel area. An insulating layer 14 is disposed on the surface of the back plate 8 to cover the cathode electrode 16 except the emitter 18. A gate electrode 12 is formed on the insulating layer 14 except the emitter 18 and has a structure of plural line patterns arranged in a direction of the Y-axis.

The fourth embodiment flat panel display may be operated by the first driving method describe above. However, a suitable one among the aforesaid driving methods may be adapted for driving the fourth embodiment flat panel display.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A flat panel display, comprising:
   first and second substrates facing each other;
   first and second electrodes disposed on the first substrate and insulated from each other by an insulating layer;
   a field emission source on the first substrate; and
   a grid plate provided with a plurality of apertures corresponding to a pixel area and disposed between the first and second substrates,
   wherein the field emission source is formed of carbonaceous materials selected from the group consisting of carbon nanotube (CNT), fullerene ($C_{60}$), diamond liked carbon (DLC), and graphite.

2. The flat panel display of claim 1, wherein the field emission source is formed on the second electrodes.

3. A flat panel display, comprising:
   first and second substrates facing each other;
   first and second electrodes disposed on the first substrate and insulated from each other by an insulating layer;
   a field emission source on the first substrate; and
   a grid plate provided with a plurality of apertures corresponding to a pixel area and disposed between the first and second substrates,
   wherein the field emission source is formed of nanometer size materials selected from the group consisting of carbon nanotube (CNT), and fullerene ($C_{60}$).

4. The flat panel display of claim 3, wherein the field emission source is formed on the second electrodes.

5. A flat panel display, comprising:
   first and second substrates facing each other;
   first and second electrodes disposed on the first substrate and insulated from each other by an insulating layer;
   a planar field emission source on the first substrate; and
   a grid plate provided with a plurality of apertures corresponding to a pixel area,
   wherein the grid plate is formed over the first substrate.

6. A flat panel display, comprising:
first and second substrates facing each other;
first and second electrodes disposed on the first substrate and insulated from each other by an insulating layer;
a planar field emission source on the first substrate; and
a mesh electrode having a plurality of apertures corresponding to a pixel area and disposed between the first and second substrates.

* * * * *